US012690059B2

(12) United States Patent (10) Patent No.: US 12,690,059 B2
Chintalapudi et al. (45) Date of Patent: Jul. 21, 2026

(54) ENHANCED CHANNEL HOPPING WIRELESS PROTOCOL TO ADDRESS SHORT-TERM FADING

(71) Applicant: MICROSOFT TECHNOLOGY LICENSING, LLC, Redmond, WA (US)

(72) Inventors: Krishna Kant Chintalapudi, Redmond, WA (US); Joseph Michael Schaefer, Carnation, WA (US); Gopala Sri Hari Narlanka, Bellevue, WA (US); Hao Yin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 18/340,809

(22) Filed: Jun. 23, 2023

(65) Prior Publication Data

US 2024/0430922 A1 Dec. 26, 2024

(51) Int. Cl.
| | |
|---|---|
| *H04W 72/542* | (2023.01) |
| *H04W 24/02* | (2009.01) |
| *H04W 72/044* | (2023.01) |

(52) U.S. Cl.
CPC ......... *H04W 72/542* (2023.01); *H04W 24/02* (2013.01); *H04W 72/044* (2013.01)

(58) Field of Classification Search
CPC . H04W 72/542; H04W 24/02; H04W 72/044; H04W 4/80; H04W 4/02; H04L 43/55; H04L 41/14; H04L 63/1433; H04L 63/1441; G06Q 30/0201
See application file for complete search history.

(56) References Cited

U.S. PATENT DOCUMENTS

| | | | | |
|---|---|---|---|---|
| 2018/0234712 A1* | 8/2018 | Chen | .................. | H04N 21/4384 |
| 2021/0073769 A1* | 3/2021 | Gordon | .................. | G06Q 20/34 |
| 2023/0396528 A1* | 12/2023 | Hughes, Jr. | ............. | H04L 43/55 |

* cited by examiner

*Primary Examiner* — Iqbal Zaidi
(74) *Attorney, Agent, or Firm* — Scott Y. Shigeta; Newport IP, LLC

(57) ABSTRACT

Short-term fading can be addressed through channel hopping mechanisms in the time scale of few milliseconds. Existing do not address short-term fading. For example, Wi-Fi channel change mechanisms take several 100 ms to perform a channel change. Short-term fading lasts around 80 ms and those methods would not detect or solve issues with missing packets at this speed. The present disclosure proposes a novel method where, a computer and all other devices, e.g., a game console and game controllers, switch channels every 8 to 16 ms through a pre-agreed upon channel sequence. Thus, even if one of the channels is undergoing a deep fade, the controllers/console will be able to leverage other channels to minimize packet loss rates.

17 Claims, 8 Drawing Sheets

Scan Channels to Select and/or Rank K Channels

FIG. 3

Select and/or Rank K Channels

100

101

102

110
Select
Channels

2

5
6

8

Ranked List
110'

6, 8, 2, 5

Th 1
Th 2
Th 3
Th 4
Th 5
Th 6
Th 7
Th 8

. . .

Communicate Selected and/or Ranked Channels

100

101

Ranked List
110'

6, 8, 2, 5

102

Communicate Selected and/or Ranked Channels

100

101

120

Payload
Data

Channel Hop at Each Interval (i)

FIG. 7

ENHANCED CHANNEL HOPPING WIRELESS PROTOCOL TO ADDRESS SHORT-TERM FADING

BACKGROUND

Different types of network connections have different stability and reliability requirements. For instance, a wireless network connection between a laptop and a network router can have a particular set of requirements that is much different than a wireless network connection between a gaming console and a game controller. Moreover, a wireless network connection between a gaming console and a game controller can have yet other requirements when audio signals are transmitted between the devices.

A wireless network connection between a game controller and a game console can use specific Wi-Fi channels. During use, some channels can go bad. This loss of connectivity can be due to interference from other networks. For example, there may be interference from a mesh network in the background, or another player may be using the same channel for another gaming console, or there can be many other sources of interference. In some cases, a wireless network connection may be caused by short-term fading.

In some use scenarios, such as in a laptop and router connection, short-term fading can be acceptable and cause minimal interruption. A few missing packets can be lost, and a video streaming session or a download may not be interrupted or delayed. For instance, a delay or a loss in quality during a video transmission or a file download would not be noticeable. However, the network connection between the gaming console and the game controller requires a much higher level of reliability. When it comes to gaming applications, a momentary loss of a connection, even caused by short-term fading, can have a significant impact to an application. Some games base an outcome on the fastest reaction times and competing inputs from other gamers. A missed packet, or a packet that is delayed even a few milliseconds, can greatly change the outcome of a game.

Given these different sources and types of interference issues, there are a number of existing solutions. However, most existing situations are really designed to address long-term phenomenon. Existing solutions do not address short-term fading issues.

SUMMARY

Short-term fading is addressed through channel hopping mechanisms in the time scale of a few milliseconds. Existing systems do not address short-term fading. For example, Wi-Fi channel change mechanisms take several 100 ms to perform a channel change. Short-term fading lasts around 80 ms and those methods would not detect or solve issues with missing packets at this speed. The present disclosure proposes a method where a computer and all other devices, e.g., a game console and game controllers, switch channels every 8 to 16 ms through a pre-agreed upon channel sequence. Thus, even if one of the channels is undergoing a deep fade, the controllers/console will be able to leverage other channels to minimize packet loss rates. In some embodiments, the devices automatically switch between a specific channel sequence of ranked channels. This automatic and synchronous switching for all connected devices allows for a more stable connection without requiring a system to detect an issue. This eliminates the delay that is caused by other solutions that require time for a system to detect an issue and react to the detected issue.

In some embodiments, the system can use different channel switching intervals (also referred to herein as a "hopping period") depending on the type of data that is communicated. For instance, if a controller is only communicating state information without a digital audio signal, the network connection can switch between a select set of channels every 16 milliseconds (ms). However, if a controller is communicating state information with a digital audio signal, the network connection can switch between a select set of channels every 8 ms.

The system can also select a specific number of channels depending on one or more factors. For example, a system can synchronously switch between two channels in a first scenario, or a system can synchronously rotate through four channels in a second scenario. The number of selected channels can be based on a selected hopping period and/or a detected fading period. The number of selected channels can be increased or decreased based on a change in a hopping period and/or a change in a fading period. For example, if a hopping period were to increase from 8 ms to 16 ms, the number of selected channels may increase or decrease. In another example, if a detected fading period were to increase from 80 ms to 100 ms, the number of selected channels may increase or decrease.

The number of selected channels can also be increased or decreased based on a refresh rate of a display screen associated with an application or a type of application or device. For instance, the number of selected channels may be a first number for a desktop computer but that number may increase or decrease if the user were to switch to a head mounted display. The number of selected channels can also be increased or decreased based on an application type. For instance, the number of selected channels may be a first number for a video player application but that number may increase or decrease if the user were to switch to a video game.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 shows a third state of a system for providing an enhanced channel hopping wireless protocol to address short-term fading.

FIG. 6 shows a timing diagram for a channel hopping wireless protocol to address short-term fading.

FIG. 7 is a flow diagram showing aspects of a routine for utilizing the network effect of end-user viral adoption of services and applications by clustering users based on characteristics of requests to configure new tenants.

DETAILED DESCRIPTION

Figure 1:
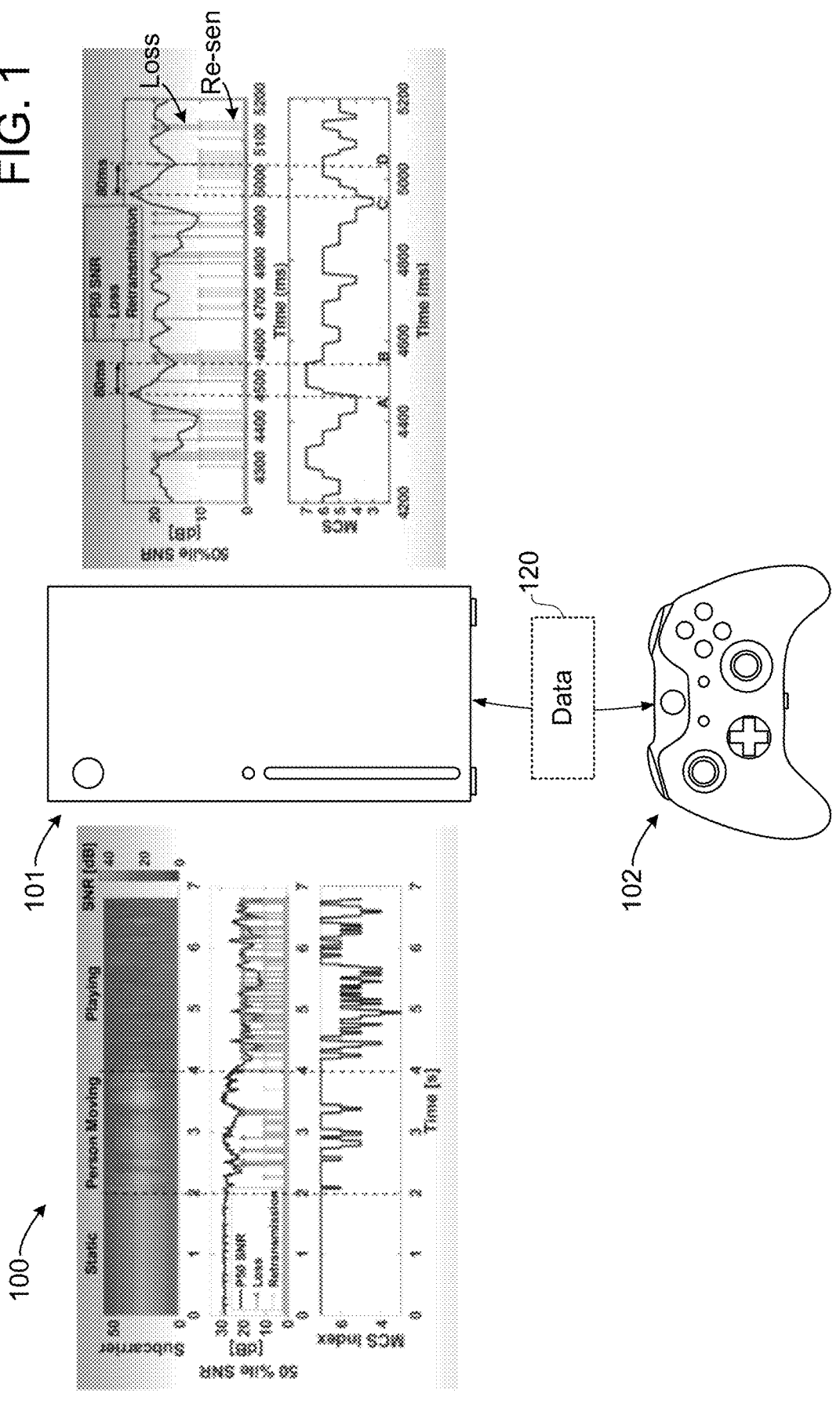
FIG. 1 is a block diagram of a system for providing an enhanced channel hopping wireless protocol to address short-term fading.

As shown in FIG. 1, a system 100 includes a computing device 101 and a remote computing device 102. In this example, the computing device 101 is a gaming console and the remote computing device 102 is a game controller. This example for illustrative purposes and is not to be construed as limiting. It can be construed that the system can include any type of computing device and have any number devices that are connected using a wireless network.

In general, the wireless network connection can communicate serval types of data 120 (also referred to herein as payload data 120). For example, a console and a controller can communicate audio data and state data. The audio data can include encoded audio signals that can be used to communicate voice transmissions, music, game sounds, etc. In some configurations, the controller 102 can be connected to headphones so the user can hear music and game sounds through data communicated between the console and the controller.

The state data can include a number of other items. For example, for a gaming application, the state data can indicate a joystick position or state information of a button position. The state information can also include information pertaining to the data transmission. For example, as shown in FIG. 1, the state data can indicate a signal to noise ratio over time. The diagrams of FIG. 1 show state data a scenario for a gaming console and a gaming controller.

Part 1: between zero to two seconds on the right figure, the controller static, so the controller is essentially lying on the table. There is very little noise during this period of time.

Part 2: between 2-4 seconds, person walks into the room with the controller. The wireless channel is changing and the reason it's changing is because the wireless waves are bouncing off of the person, walls as he moves. There is a little more noise during this period of time.

Part 3: between 4-7 seconds, the person is quickly moving the controller actively trying to activate a button, move a joystick, and so on. There are also quick changes in the way in the, for example, orientation between the transmitter and the receiver. That activity is causing the wireless channel to change very fast, and there is increased noise, also shown in a MCS index. The Modulation Coding Scheme (MCS) index is a metric based on several parameters of a Wi-Fi connection between two stations.

The 50-percentile signal to noise ratio (SNR) chart, shown in the left diagram, shows three phases: Phase 1: 30 dB with little change and little loss, Phase 2: some change, and Phase 3: rapid changes. To address these noise issues, in some systems, when there are losses, the system reduces the rate of transmission and sometimes re-transmits packets. But the issue with this solution is that the effectiveness of such solutions depends on how fast the system adapts. The existing solutions are ok for long-term issues, e.g., long-term phenomenon, a signal that is lost for a few seconds. Once a set of packets are missing, those can be re-transmitted. However, for short-term fading, such as a loss that occurs over a short period of time, e.g., 80 milliseconds, as shown, the existing techniques do not react fast enough.

Long-term phenomenon, for instance, can occur when somebody starts a mesh network in the background and the interference just goes through the roof. This is a more long-term phenomenon because this is going to last for several seconds, or as long as this mesh networks keeps on going, or as long as a person keeps playing or streaming Netflix in the neighboring house, etc. So those are the long-term phenomenon. A long-term phenomenon may last several seconds to several minutes. Short-term phenomena that are more like 40 milliseconds, 80 milliseconds, 100 milliseconds and so on.

When the channel deteriorates suddenly, it takes some time for the rate adaptation to figure out that something has gone wrong. For example, within a second, a system can lose many packets. In the image on the upper right, the top of the vertical arrows are all packet losses and bottom arrows are all retransmissions (where packets are "re-sent"). So many packets are lost, the system is retransmitting, those packets are getting lost, then there is another retransmitting session, and the system gives up at some point.

Occasional packet losses can't be perceived in most cases. So, for example, let's say one packet gets lost and let's say 1% of the time you the average user may not be able to tell in a download or in a video stream. But when consecutive packets get lost, the system has a silence period that gets induced. So, for example, when 3 packets get lost, which means 24 milliseconds worth of data is completely gone, and the system has a silence period there. This can be significant for a video stream but more significant for a game where the timing on a button press on a controller is important. In these scenarios, where there is a science period of 24 milliseconds or more, it has been shown that people can detect the loss in audio quality, video quality, and definitely in a gaming scenario.

In another example, when a user is moving a joystick around, and there is a short-term connect loss, where 3 consecutive packets are lost. This means that in a 24 millisecond period, that person's latest position of the joystick did not go to the console. In a car game, for example, the game missed all of those inputs. This kind of discontinuity, a sudden abrupt discontinuity as perceived by the game engine, and that can cause things like car toppling around or car not responding very well to your movements. In general, consecutive losses especially bad for game scenarios.

As described above, in some systems, e.g., some Wi-Fi systems, address long-term fading. Usually, channel measurements are conducted and a system identifies which channel is an interference free channel or which channel has very few access points, etc. These tests determine a metric which measures the quality of a channel based on the number of access points based on the interference, background interference and various other sort of metrics, etc. If this happens every 10 or 20 seconds, the system may move to another channel. As described herein, this does not address short-term fading, e.g., interference that only lasts 80 ms or 100 ms.

The disclosed techniques address the issue of short-term fading, where a system has a predetermined sequence of channels and the sequence moves through at a predetermine rate which is optimized for short-term fading. In one example, the sequence can be as simple as channel 1 and channel 2. So the process may start with the first 80 milliseconds in channel 1, then both the first device 101 and the second device 102 will both change to Channel 2 at the same time. Then after another interval of the period of time, e.g., 80 milliseconds, both devices go back to channel 1. This process repeats itself between Channel 1 and Channel 2 to keep a stable connection even if one of the channels suffers from short-term fading.

In the present example, consider a scenario where one channel goes into a short-term fade. It's unlikely that Channel 2 will also be experiencing a deep fade at that same time. So, with both channels being used, it is unlikely the connection will need to reduce the rate or lose a packet. It's unlikely that the packet will get lost in the second one. And so even if the system has short-term fading in one channel, the other one will succeed. This method is also enhanced further when more channels are used, e.g., k=3 channels or k=4 channels, and the system traverses through those channels in an ordered sequence.

The disclosed techniques are distinguished from Bluetooth channel hopping. The use of the term hopping in that context is a modulation layer, e.g., and switching occurs using a different technology and works in terms of microseconds, sub-microsecond, or even nanosecond granularity. Frequency hopping is at a different speed and solves a different problem and is a different solution that is also triggered by different events. This technique lets entire packets or groups of packets through, which also provides the right timing to address short-term fading.

In addition, in the techniques disclosed herein, the time interval in which the channels are done automatically can be based on a frequency range or a use type. For example, when a system uses Wi-Fi frequencies, that system can select 8 ms intervals to switch channels. This addresses the short-term fading. Similarly, when the use type involves controller-console connections, the system can select 8 ms intervals to switch channels. This is different than other systems in that, in some embodiments, an entire packet is delivered, or at least two packets are delivered, before a hop is made.

Because the quantitative aspect can depend on the radio that the specific radio that a system is using, when a system does a two pattern channel hopping, there can be a 10× reduction in any type of silence period. When a system has a four hopping channel pattern, the probability of a silence period is close to zero. So there is less than 10 to the minus four improvement. This is the reason why the number of selected channels, e.g., K, is selected. The benefit is exponentially better with just a few channels.

FIGS. 2-6 shows another example of a solution that addresses short-term fading. In this example, a system has a predetermined sequence of channels and the sequence moves through at a predetermine rate which is optimized for short-term fading. The method involves selecting a number of predetermined channels, e.g., K=4. In this example, the predetermine rate, e.g., the switching interval, is 8 ms. As described herein, the switching interval can be based on the type of data that is being communicated, a type of application, etc.

Figure 2:
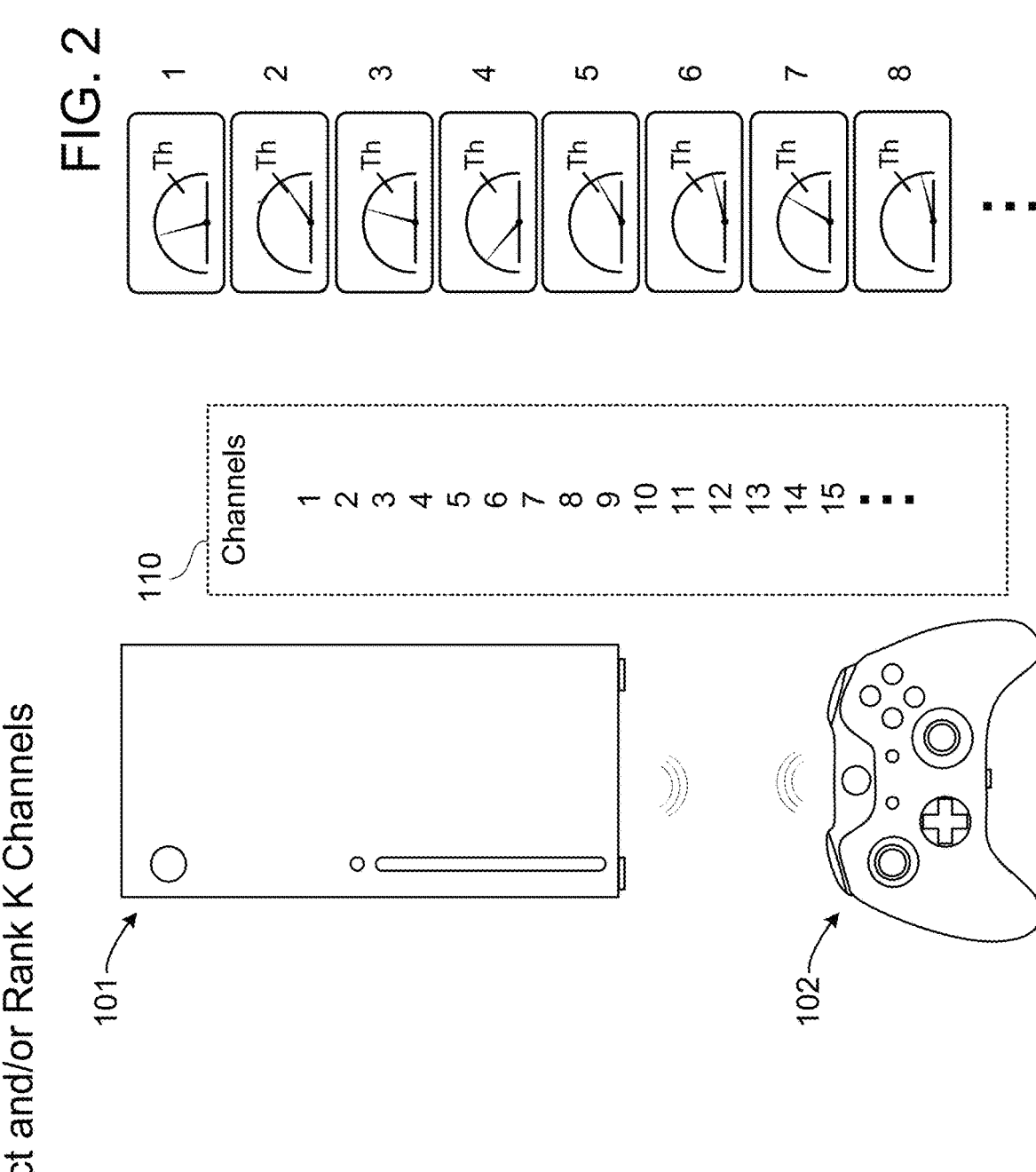
FIG. 2 shows a first state of a system for providing an enhanced channel hopping wireless protocol to address short-term fading.

As shown in FIG. 2, the computing device selects a subset of channels from a plurality of channels of the network connection by testing each channel. The subset of channels are selected in response to determining that the subset of channels meet one or more performance metrics with respect to one or more performance thresholds. The performance metrics can include any type of unit of measure with respect to a connection including a channel busy time, number of access points, etc. Any other performance metric can be used to determine selection of a channel that can be used for the channel hopping routine.

Figure 3:
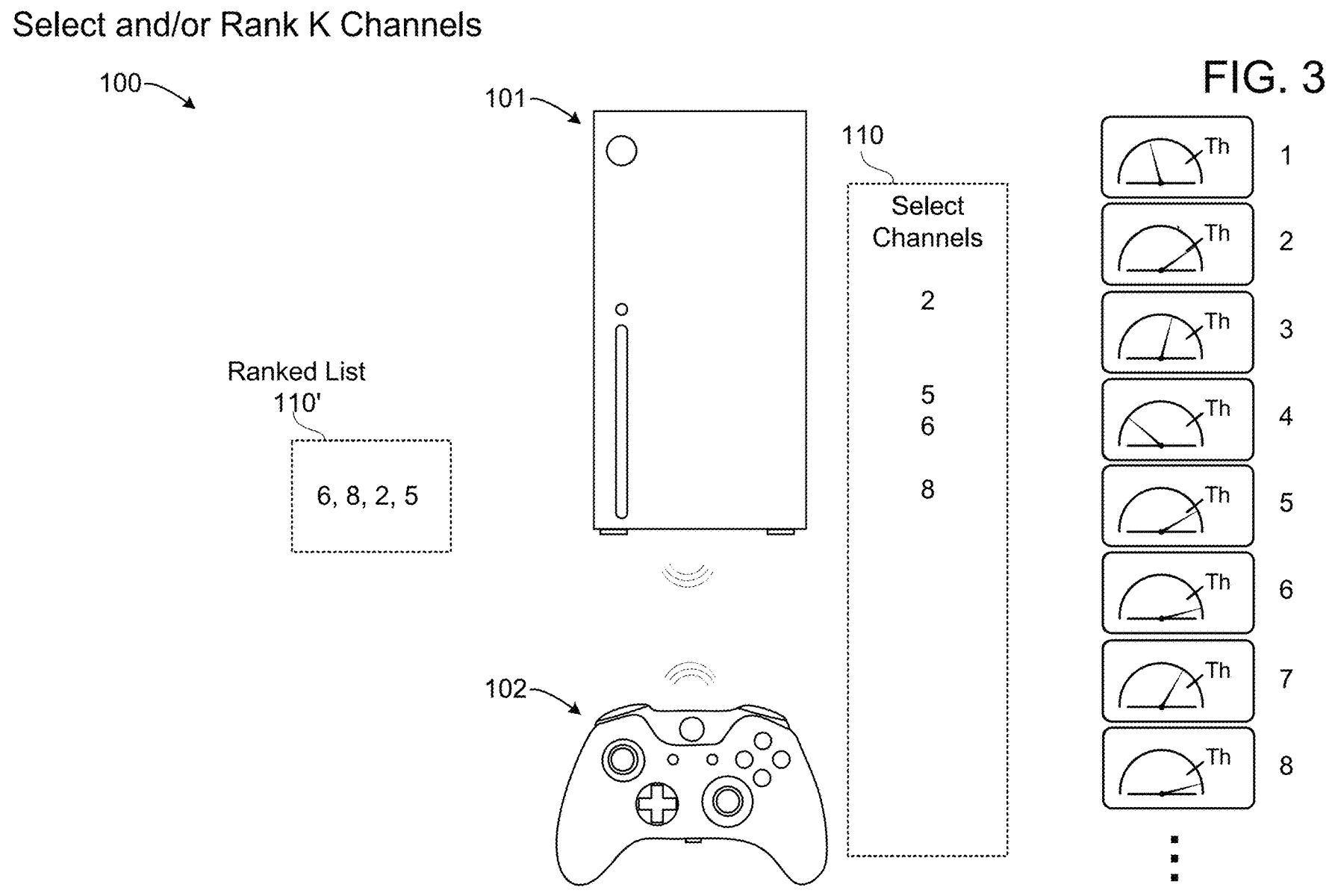

As shown in FIG. 3, the selected channels can be ranked in a ranked list 110' based on individual performance metrics of each of the subset of channels. For instance, in this example, one or more measurements of a performance metric can be made for each channel and compared against one or more performance thresholds. A rank for an individual channel can be based on a value of a measurement of that channel. The rank can also be based on one or more values based on multiple measurements for a particular channel. For instance, a value based on a combination, e.g., an average or sum, of values for a channel busy time and number of access points can be used to rank a particular channel. In this example, channel 6 ranks highest, next is channel 8, then channel 2 and then channel 5.

In some embodiments, the number of channels is selected, e.g., K=4. This can be based one or more factors such as a total number of channels that are available or a desired reliability, as described herein. If K=4 is selected to have a greatly reduced chance of short-term fading issues, the system would select the best 4 channels of the channels that are tested.

The computing device can generate metadata 110' defining an ordered sequence of the individual channels of the subset of channels. The ordered sequence is based on the individual performance metric of an individual channel of the subset of channels. The metadata is also referred to herein as a contract that can be generated on either device. The subset of channels is based on an identification of a top ranked set of channels that is limited to a predetermined number (K) of channels. The limit of channels can be based on a total number of available channels or based on a desired reliability.

Figure 4:
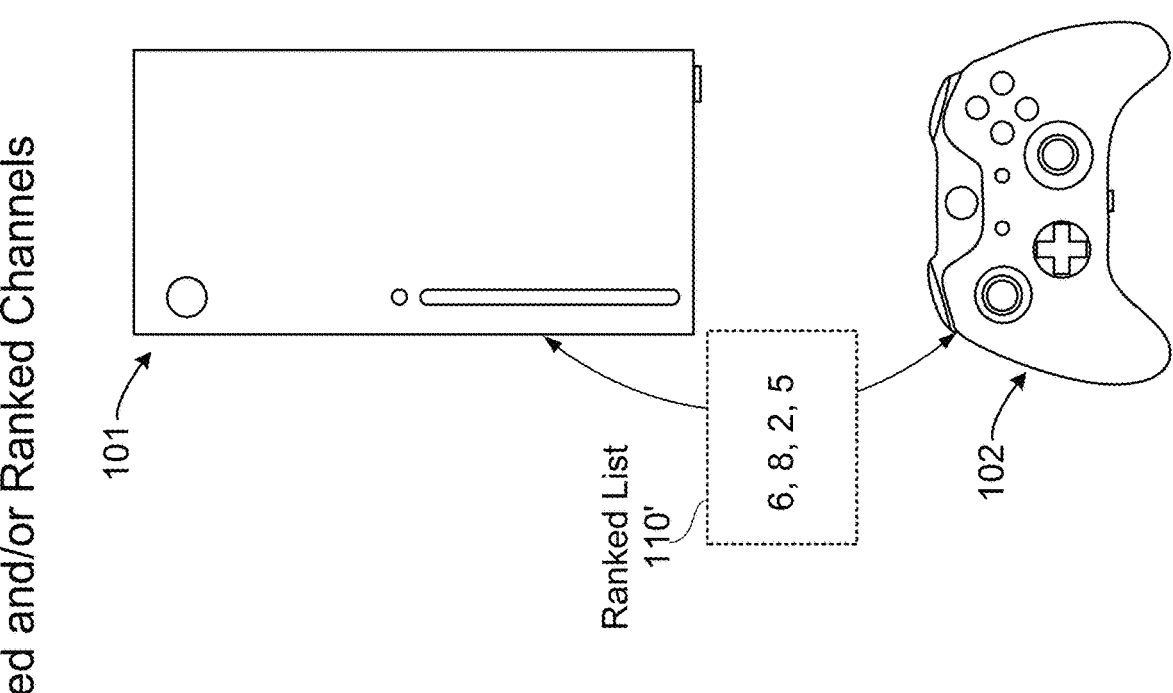
FIG. 4 shows a fourth state of a system for providing an enhanced channel hopping wireless protocol to address short-term fading.

As shown in FIG. 4, the metadata is communicated from the device on which it is generated to the remote device. In this example, the computing device 101 can communicate the metadata 110 defining the ordered sequence of the individual channels of the subset of channels to the remote device 102.

Figure 5:
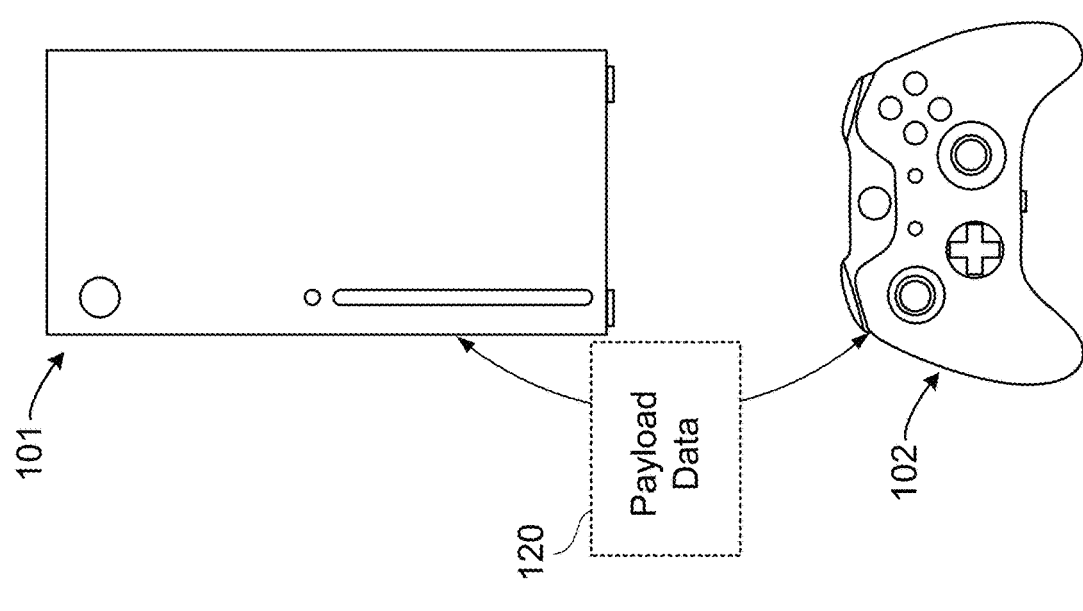
FIG. 5 shows a fifth state of a system for providing an enhanced channel hopping wireless protocol to address short-term fading.
Figure 6:
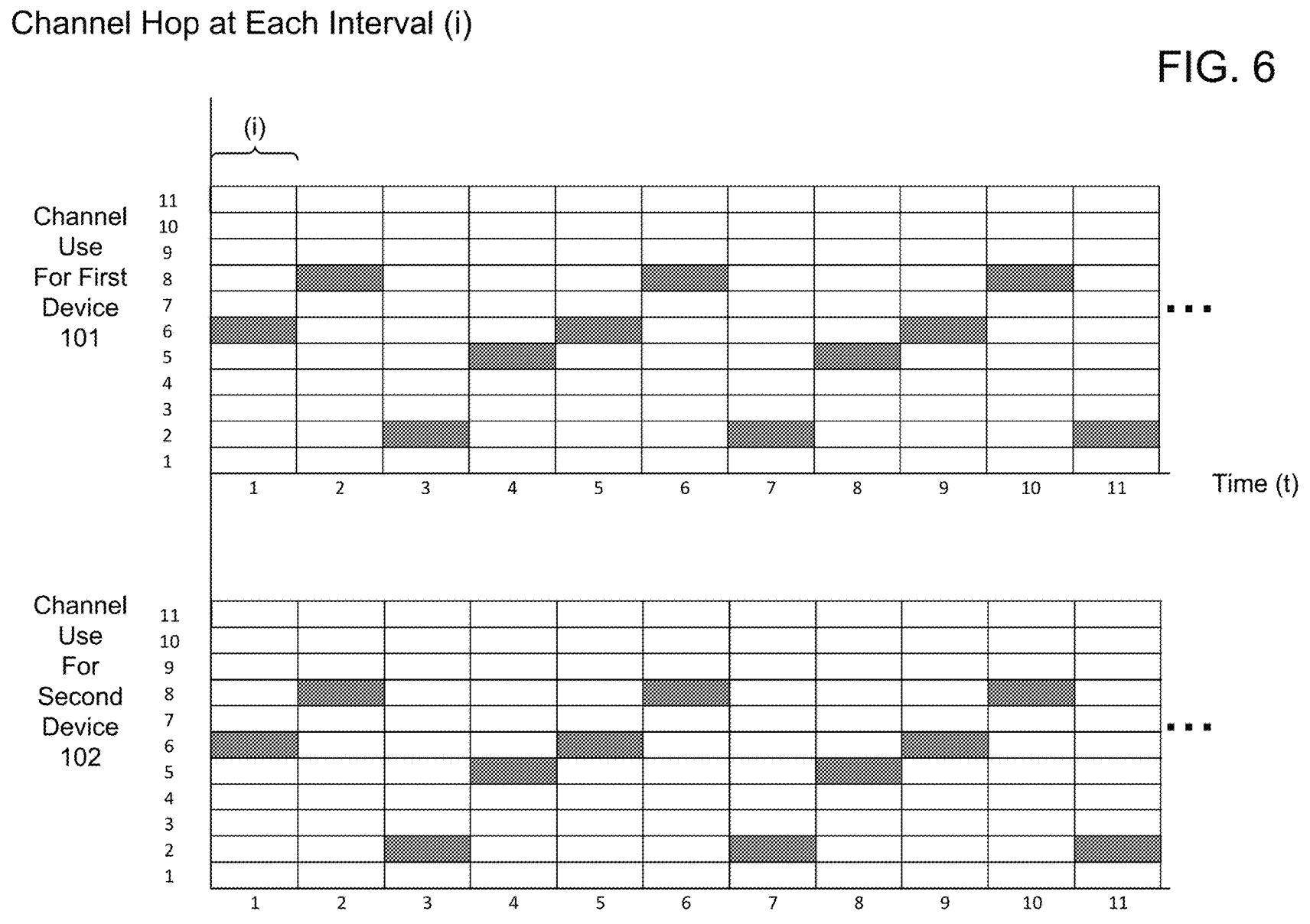
Figure 8:
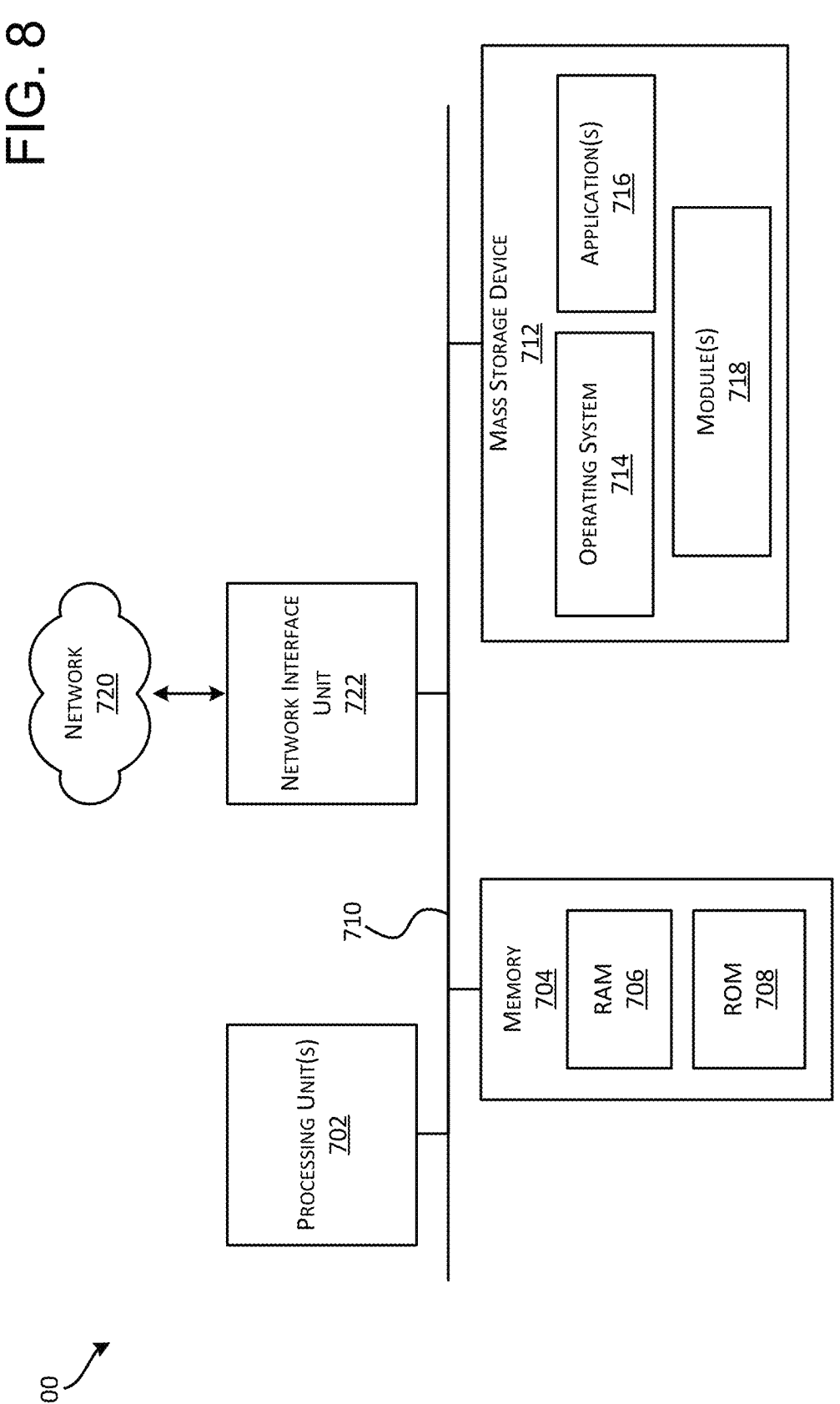
FIG. 8 is a computer architecture diagram illustrating an illustrative computer hardware and software architecture for a computing system capable of implementing aspects of the techniques and technologies presented herein.

As shown in FIG. 5 and FIG. 6, the computing device and the remote device cause the communication of the payload data 120 through the network connection by traversing through the subset of channels using the ordered sequence defined in the metadata 110. The metadata 110 causes the computing device 101 and the remote device 102 to synchronously change channels in the ordered sequence of the subset of channels a time interval (i). In some embodiments, the communication of the payload data 120 includes the communication of at least two packets for each time interval (i). A selection of a predetermined number of channels of the subset of channels and a selection of the time interval increases the stability and reliability of the network connection.

While communicating the payload data, the computing device monitors the payload traffic and or other timers or sensors to detect one or more events. If the detected event includes a change in the data type of the payload, the routine proceeds to operation 611 where the computing device modifies one more parameters of the network connection. In one example of a parameter change, the computing device can increase or decrease the interval in response to the detection of a data type change.

For example, if the computing device detects that one of the devices adds data packets (e.g., voice audio or music) to state data packets (e.g., joystick position), the system can reduce the interval (i). For example, consider a scenario where a person was just using his video game controller and was on a channel hopping period (the interval) was at 16 milliseconds (ms). Then later, the person decides to insert an audio jack and start listening audio signals, e.g., they add PCM data. In operation 609, the system will then drop down to 8 ms hopping.

In another example, consider a scenario where a person is communicating with a hopping interval at 8 ms. This may occur when the computing device detects that the devices are communicating both audio data packets (e.g., voice audio or music) with state data packets (e.g., joystick position). Then later, when the user removes an audio device, and the audio signals are no longer being communicated in the payload, the system can increase the interval (i). For example, the computing device may increase the hopping period to 16 milliseconds.

In yet another example, the computing device monitors other modules for triggering events, such as a timer. If a timer indicates a predetermined scan interval has passed, the system may return the route back to operation 601, where the computing device scans the channels to select and/or rank channels for the channel hopping operations. This way, at certain time intervals or in response to a predetermined event, the system may select and/or rank channels so that new channels or new combinations of channels can be used. A predetermined scan interval can be in the range of 10 seconds to 20 seconds. Thus, every scanning period, e.g., 20 seconds or so, the system will either re-rank the existing subset of channels or scan all of the available channels and select and rank a new subset of channels.

FIG. 6 is an example flow diagram showing aspects of a method implementing the techniques that are disclosed herein. For ease of understanding, the method discussed in this disclosure are delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

The routine starts at operation 601, where a computing device selects a subset of channels from a plurality of channels of the network connection. The subset of channels are selected in response to determining that the subset of channels meet one or more performance metrics with respect to one or more performance thresholds. The performance metrics can include any type of unit of measure with respect to a connection including a channel busy time, number of access points, etc. Any other performance metric can be used to determine selection of a channel that can be used for the channel hopping routine.

The system can also select a specific number of channels depending on one or more factors. For example, a system can synchronously switch between two channels in a first scenario, or a system can synchronously rotate through four channels in a second scenario. The number of selected channels can be based on a selected hopping period and/or a detected fading period. The number of selected channels can be increased or decreased based on a change in a hopping period and/or a change in a fading period. For example, if a hopping period were to increase from 8 ms to 16 ms, the number of selected channels may increase or decrease. In another example, if a detected fading period were to increase from 80 ms to 100 ms, the number of selected channels may increase or decrease.

The number of selected channels can also be increased or decreased based on a refresh rate of a display screen associated with an application or a type of application or device. For instance, the number of selected channels may be a first number for a desktop computer but that number may increase or decrease if the user were to switch to a head mounted display. The number of selected channels can also be increased or decreased based on an application type. For instance, the number of selected channels may be a first number for a video player application but that number may increase or decrease if the user were to switch to a video game.

The selected channels can be ranked based on individual performance metrics of each of the subset of channels. For instance, in the example shown in FIG. 2, one or more measurements of a performance metric can be made for each channel and compared against one or more performance thresholds. A rank for an individual channel can be based on a value of a measurement of that channel. The rank can also be based on one or more values based on multiple measurements for a particular channel. For instance, a value based on a combination, e.g., an average or sum, of values for a channel busy time and number of access points can be used to rank a particular channel.

At operation 603, the computing device can generate metadata 110 defining an ordered sequence of the individual channels of the subset of channels. The ordered sequence is based on the individual performance metric of an individual channel of the subset of channels. The metadata is also referred to herein as a contract that can be generated on either device.

At operation 605, the metadata is communicated from the device on which it is generated to the remote device. In the example of FIG. 4, the computing device can communicate the metadata 110 defining the ordered sequence of the individual channels of the subset of channels to the remote device 102.

At operation 607, the computing device causes the computing device to communicate payload data 120 through the network connection by traversing through the subset of channels using the ordered sequence defined in the metadata 110. In operation 607, the metadata 110 causes the computing device 101 and the remote device 102 to synchronously change channels in the ordered sequence of the subset of channels a time interval (i). The communication of the payload data 120 includes the communication of at least two packets for each time interval (i). A selection of a predetermined number of channels of the subset of channels and a selection of the time interval increases the stability and reliability of the network connection.

At operation 609, the computing device monitors the payload traffic and or other timers or sensors to detect one or more events. If the detected event includes a change in the data type of the payload, the routine proceeds to operation 611 where the computing device modifies one more parameters of the network connection. In one example of a parameter change, the computing device can increase or decrease the interval in response to the detection of a data type change.

For example, if the computing device detects that one of the devices adds data packets (e.g., voice audio or music) to state data packets (e.g., joystick position), the system can reduce the interval (i). For example, consider a scenario where a person was just using his video game controller and was on a channel hopping period (the interval) was at 16 milliseconds (ms). Then later, the person decides to insert an audio jack and start listening audio signals, e.g., they add PCM data. In operation 609, the system will then drop down to 8 ms hopping.

In another example, consider a scenario where a person is communicating with a hopping interval at 8 ms. This may occur when the computing device detects that the devices are communicating both audio data packets (e.g., voice audio or music) with state data packets (e.g., joystick position). Then later, when the user removes an audio device, and the audio signals are no longer being communicated in the payload, the system can increase the interval (i). For example, the computing device may increase the hopping period to 16 milliseconds.

In yet another example, at operation 609, the computing device monitors other modules for triggering events, such as a timer. If a timer indicates a predetermined scan interval has passed, the system may return the route back to operation 601, where the computing device scans the channels to select and/or rank channels for the channel hopping operations. This way, at certain time intervals or in response to a predetermined event, the system may select and/or rank channels so that new channels or new combinations of channels can be used. A predetermined scan interval can be in the range of 10 seconds to 20 seconds. Thus, every scanning period, e.g., 20 seconds or so, the system will either re-rank the existing subset of channels or scan all of the available channels and select and rank a new subset of channels.

Figure 7:
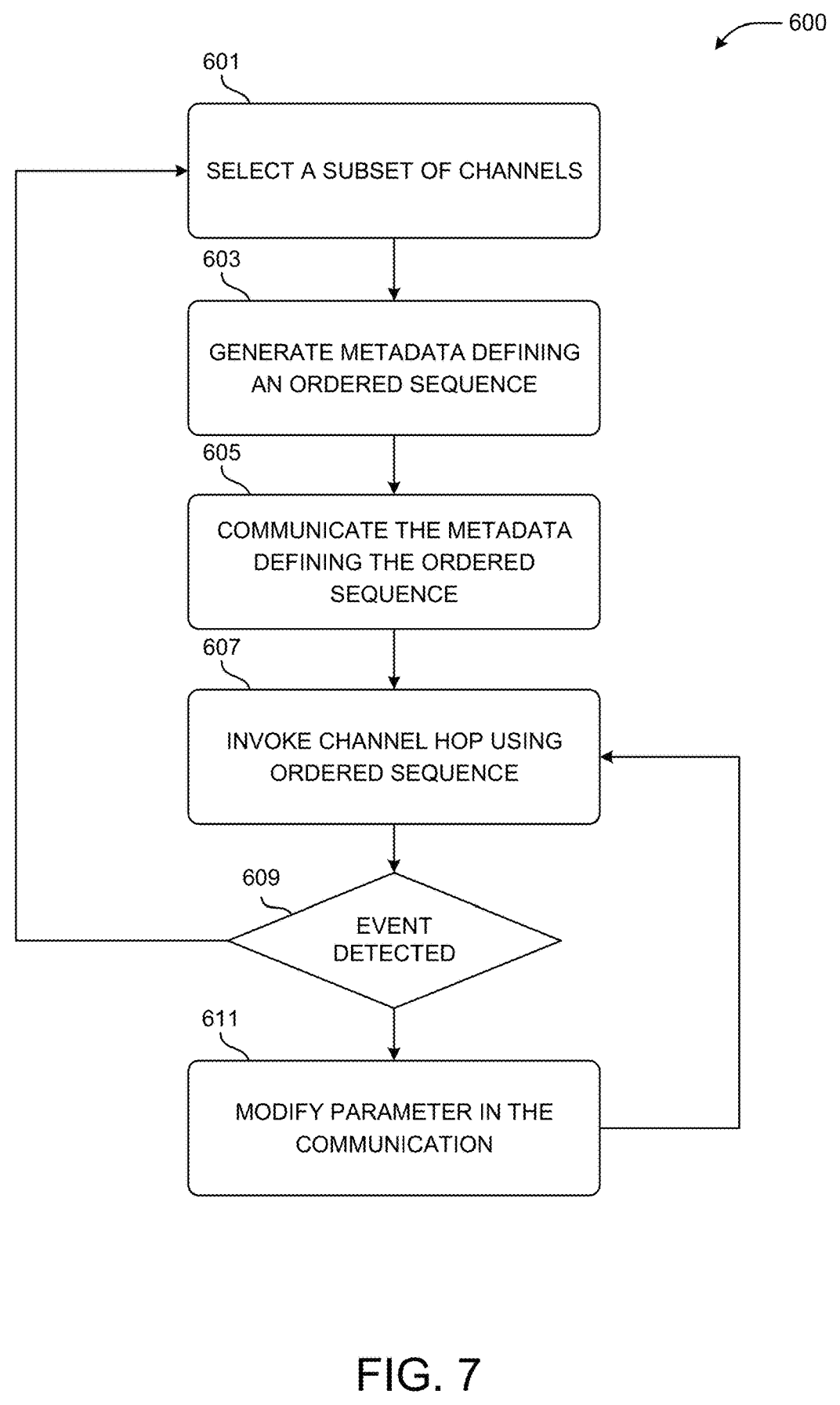

FIG. 7 shows additional details of an example computer architecture 700 for a device, such as a computer or a server capable of executing computer instructions. This computer architecture 700 can be an architecture for either computer of FIGURE. The computer architecture 700 illustrated in FIG. 7 includes processing unit(s) 702, a system memory 704, including a random-access memory 706 (RAM) and a read-only memory (ROM) 708, and a system bus 710 that couples the memory 704 to the processing unit(s) 702. The processing units 702 may also comprise or be part of a processing system. In various examples, the processing units 702 of the processing system are distributed. Stated another way, one processing unit 702 of the processing system may be located in a first location (e.g., a rack within a datacenter) while another processing unit 702 of the processing system is located in a second location separate from the first location.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, the terms computer storage media, non-transitory storage media, computer-readable storage device, non-transitory storage device, and other variations thereof includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710.

It should be appreciated that the software components described herein may, when loaded into the processing unit(s) 702 and executed, transform the processing unit(s) 902 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

While certain example embodiments have been described, these embodiments have been presented by way of example only and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first"

and "second" within the Summary, Detailed Description, and/or claims may be used to distinguish between two different instances of the same element (e.g., two different datasets, two different visualizations).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method of improving stability and reliability of a wireless network connection between a computing device and a remote device, the method for execution on the computing device:

selecting a subset of channels from a plurality of channels of the network connection, wherein the subset of channels are selected in response to determining that the subset of channels meet one or more performance metrics with respect to one or more performance thresholds, wherein the subset of channels are ranked based on an individual performance metrics of each of the subset of channels;

generating metadata defining an ordered sequence of the individual channels of the subset of channels, wherein the ordered sequence is based on the individual performance metric of an individual channel of the subset of channels;

communicating the metadata defining the ordered sequence of the individual channels of the subset of channels from the computing device to the remote device; and causing the computing device to communicate payload data through the network connection by traversing through the subset of channels using the ordered sequence defined in the metadata, wherein the metadata causes the computing device and the remote device to synchronously change channels in the ordered sequence at a time interval (i), wherein communication of the payload data includes the communication of at least two packets for each time interval (i), a predetermined number of channels (K) of the subset of channels and use of the time interval (i) increases the stability and reliability of the network connection;

further comprising:

monitoring a timer based on a scanning time period; and in response to determining that the scanning time period has lapsed:

selecting a new subset of channels from the plurality of channels of the network connection, wherein the subset of channels are selected in response to determining that the new subset of channels meet the one or more performance metrics with respect to the one or more performance thresholds, wherein the new subset of channels are ranked based on the individual performance metrics of each of the new subset of channels;

generating updated metadata defining a new ordered sequence of the individual channels of the subset of channels, wherein the new ordered sequence is based on the individual performance metric of the individual channel of the new subset of channels;

communicating the updated metadata defining the new ordered sequence of the individual channels of the new subset of channels from the computing device to the remote device; and causing the computing device to communicate the payload data through the network connection by traversing through the new subset of channels using the new ordered sequence defined in the updated metadata, wherein the updated metadata causes the computing device and the remote device to synchronously change channels using the new ordered sequence at the time interval (i), wherein communication of the payload data includes the communication of at least two packets for each time interval (i).

2. The method of claim 1, further comprising:

monitoring the communication of the payload data to identify a data type change; and in response to determining that the data type of the payload data changes and adds audio data to state data, changing the time interval to a new time interval, wherein the new time interval is lower than the time interval.

3. The method of claim 1, further comprising:

monitoring the communication of the payload data to identify a data type change; and in response to determining that the data type of the payload data changes and removes audio data and starts to include state data without audio data, changing the time interval to a new time interval, wherein the new time interval is higher than the time interval.

4. The method of claim 1, wherein the time interval is between 8 ms and 16 ms.

5. The method of claim 1, wherein the individual performance metrics of each of the subset of channels are ranked according to at least one of a number of access points, a metric indicating an interference level, or a data rate.

6. The method of claim 1, wherein a selection of the subset of channels is based on an identification of a top ranked set of channels that is limited to a predetermined number (K) of channels.

7. A computing device for improving stability and reliability of a wireless network connection between a computing device and a remote device, the computing device comprising:

one or more processing units; and a non-transitory computer-readable storage medium having encoded thereon computer-executable instructions to cause the one or more processing units to:

select a subset of channels from a plurality of channels of the network connection, wherein the subset of channels are selected in response to determining that the subset of channels meet one or more performance metrics with respect to one or more performance thresholds, wherein the subset of channels are ranked based on an individual performance metrics of each of the subset of channels;

generate metadata defining an ordered sequence of the individual channels of the subset of channels, wherein the ordered sequence is based on the individual performance metric of an individual channel of the subset of channels;

communicate the metadata defining the ordered sequence of the individual channels of the subset of channels from the computing device to the remote device; and cause the computing device to communicate payload data through the network connection by traversing through the subset of channels using the ordered sequence defined in the metadata, wherein the metadata causes the computing device and the remote device to synchronously change channels in the ordered sequence of the subset of channels a time interval (i), wherein communication of the payload data includes the communication of at least two packets for each time interval (i), wherein a selection of a predetermined number of channels of the subset of channels and a selection of the time interval increases the stability and reliability of the network connection; wherein the computer-executable instructions further cause the one or more processing units of the computing device to:

monitor a timer based on a scanning time period; and in response to determining that the scanning time period has lapsed:

select a new subset of channels from the plurality of channels of the network connection, wherein the subset of channels are selected in response to determining that the new subset of channels meet the one or more performance metrics with respect to the one or more performance thresholds, wherein the new subset of channels are ranked based on the individual performance metrics of each of the new subset of channels;

generate updated metadata defining a new ordered sequence of the individual channels of the subset of channels, wherein the new ordered sequence is based on the individual performance metric of the individual channel of the new subset of channels;

communicate the updated metadata defining the new ordered sequence of the individual channels of the new subset of channels to from the computing device to the remote device; and cause the computing device to communicate the payload data through the network connection by traversing through the new subset of channels using the new ordered sequence defined in the updated metadata, wherein the updated metadata causes the computing device and the remote device to synchronously change channels using the new ordered sequence at the time interval (i), wherein communication of the payload data includes the communication of at least two packets for each time interval (i).

8. The computing device of claim 7, wherein the computer-executable instructions further cause the one or more processing units of the computing device to:

monitor the communication of the payload data to identify a data type change; and in response to determining that the data type of the payload data changes and adds audio data to state data, change the time interval to a new time interval, wherein the new time interval is lower than the time interval.

9. The computing device of claim 7, wherein the computer-executable instructions further cause the one or more processing units of the computing device to:

monitor the communication of the payload data to identify a data type change; and in response to determining that the data type of the payload data changes and removes audio data and starts to include state data without audio data, change the time interval to a new time interval, wherein the new time interval is higher than the time interval.

10. The computing device of claim 7, wherein the time interval is between 8 ms and 16 ms.

11. The computing device of claim 7, wherein the individual performance metrics of each of the subset of channels are ranked according to at least one of a number of access points, a metric indicating an interference level, or a data rate.

12. The computing device of claim 7, wherein a selection of the subset of channels is based on an identification of a top ranked set of channels that is limited to a predetermined number (K) of channels.

13. A non-transitory computer-readable storage medium having encoded thereon computer-executable instructions for improving stability and reliability of a wireless network connection between a computing device and a remote device, the computer-executable instructions causing one or more processing units of the computing device to:

select a subset of channels from a plurality of channels of the network connection, wherein the subset of channels are selected in response to determining that the subset of channels meet one or more performance metrics with respect to one or more performance thresholds, wherein the subset of channels are ranked based on an individual performance metrics of each of the subset of channels;

generate metadata defining an ordered sequence of the individual channels of the subset of channels, wherein the ordered sequence is based on the individual performance metric of an individual channel of the subset of channels;

communicate the metadata defining the ordered sequence of the individual channels of the subset of channels from the computing device to the remote device; and cause the computing device to communicate payload data through the network connection by traversing through the subset of channels using the ordered sequence defined in the metadata, wherein the metadata causes the computing device and the remote device to synchronously change channels in the ordered sequence of the subset of channels a time interval (i), wherein communication of the payload data includes the communication of at least two packets for each time interval (i), wherein a selection of a predetermined number of channels of the subset of channels and a selection of the time interval increases the stability and reliability of the network connection; wherein the computer-executable instructions further cause the one or more processing units of the computing device to:

monitor a timer based on a scanning time period; and in response to determining that the scanning time period has lapsed:

select a new subset of channels from the plurality of channels of the network connection, wherein the subset of channels are selected in response to determining that the new subset of channels meet the one or more performance metrics with respect to the one or more performance thresholds, wherein the new subset of channels are ranked based on the individual performance metrics of each of the new subset of channels;

generate updated metadata defining a new ordered sequence of the individual channels of the subset of channels, wherein the new ordered sequence is based on the individual performance metric of the individual channel of the new subset of channels;

communicate the updated metadata defining the new ordered sequence of the individual channels of the new subset of channels to from the computing device to the remote device; and cause the computing device to communicate the payload data through the network connection by traversing through the new subset of channels using the new ordered sequence defined in the updated metadata, wherein the updated metadata causes the computing device and the remote device to synchronously change channels using the new ordered sequence at the time interval (i), wherein communication of the payload data includes the communication of at least two packets for each time interval (i).

14. The non-transitory computer-readable storage medium of claim 13, wherein the time interval is 16 milliseconds, wherein the computer-executable instructions further cause the one or more processing units of the computing device to:

monitor the communication of the payload data to identify a data type change; and in response to determining that the data type of the payload data changes from having state data without audio data to having the state data and the audio data, change the time interval from 16 milliseconds to a new time interval of 8 milliseconds.

15. The non-transitory computer-readable storage medium of claim 13, wherein the time interval is 8 milliseconds, wherein the computer-executable instructions further cause the one or more processing units of the computing device to:

monitor the communication of the payload data to identify a data type change; and in response to determining that the data type of the payload data changes from having state data and audio data to having state data without audio data, change the time interval from 8 milliseconds to a new time interval of 16 milliseconds.

16. The non-transitory computer-readable storage medium of claim 13, wherein the time interval is 8 milliseconds.

17. The non-transitory computer-readable storage medium of claim 13, wherein the time interval is between 8 ms and 16 ms.

\* \* \* \* \*